E. B. STIMPSON.
RIVET.
APPLICATION FILED JUNE 3, 1907.
935,331.
Patented Sept. 28, 1909.
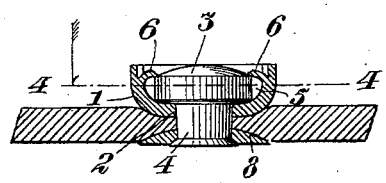
Fig. 1.
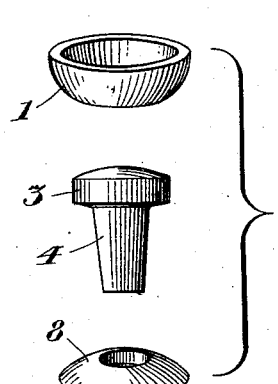
Fig. 2.
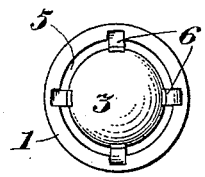
Fig. 3.
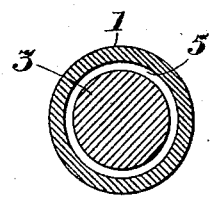
Fig. 4.
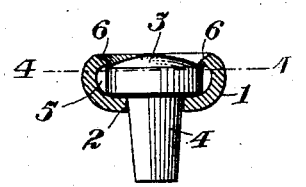
Fig. 5.
Fig. 6.
Witnesses:
Robert Head
H. A. Null
Inventor:
Edwin Ball Stimpson,
By his Attorney

UNITED STATES PATENT OFFICE.

EDWIN B. STIMPSON, OF NEW YORK, N. Y., ASSIGNOR TO EDWIN B. STIMPSON COMPANY, A CORPORATION OF NEW YORK.

RIVET.

935,331.  Specification of Letters Patent.  Patented Sept. 28, 1909.

Application filed June 3, 1907. Serial No. 377,073.

*To all whom it may concern:*

Be it known that I, EDWIN BALL STIMPSON, a citizen of the United States, and a resident of the borough of Brooklyn, city and State of New York, have invented certain new and useful Improvements in Rivets, of which the following is a specification.

My invention relates to an improved rivet applicable to a number of uses including its use as a tire protecting device for automobile-wheels and the like.

In the drawings which show only two of the forms which my invention may take together with a modified form of washer; Figure 1 is a vertical midsection of a rivet within my invention riveted in place on a piece of material and employing a washer new in this combination; Fig. 2 is a view of the various parts before assembling; Fig. 3 is a top plan view of Fig. 1; Fig. 4 is a horizontal section through line 4—4 on Fig. 1; Fig. 5 is a vertical mid-section of a modified form of washer; and Fig. 6 shows a modified cup and shank connection.

Describing now my invention with particular reference to the devices of the drawings, 1 is a cup perforated preferably with a round hole 2 through its bottom. The cup in the preferred form is rounded as shown for example in Fig. 1 for the purpose hereinafter mentioned. Received within the cup is the head 3 of a shank 4 integral therewith and extending through the hole 2 in the cup. Preferably the relative dimensions of the head 3 to the inside diameter of the cup is such as to leave a space 5 between them.

To secure the cup or head part of the rivet to its shank and prevent the shank, during the act of riveting its free end, from being forced back through the hole in the cup and thereby separated from the cup, said shank and cup members are adapted to coact with each other to prevent this separation,—as for example by infolding the rim 6 to a slight extent over the head 3 of the shank. Such rim may be infolded in this way for its entire periphery as shown in Fig. 6 or only in part as shown in Figs. 1 and 3.

As to materials, when the rivet is to be used in connection with tires, the cup will preferably be made of crucible steel, or of other hard or hardening metal, whereas the shank portion will preferably be made of soft steel or of other metal adapted to be readily riveted or upset to secure the device in place on the object.

The free end of shank 4 will preferably be riveted against a washer having beveled edges or a curved face. Thus 7 in Fig. 5 designates a washer with beveled edges and 8 in Figs. 1 and 2 a curved face washer. In either case the effect as compared with an ordinary washer having equal thickness throughout is that it prevents the edge of the washer from cutting into the material in the course of wear. Moreover another feature of considerable importance is additionally obtained which is that the beveled, cut-away or convexed inside face of the washer allows it to sink into the material in the act of riveting so that its outside face is practically flush with the material carrying the rivet. This avoids projecting metal parts which otherwise would cause wear and tear on the material of the tire below the riveted layer. Similarly the rounded profile of the underneath or contact portions of the cup 1 with the material does away with any cutting of said material from this source, the cup here also simply molding itself into the material after the manner indicated in Fig. 1.

The inturning of the cup against the head of the shank to hold the parts together during the act of riveting in no way interferes with the rough shod action of the cup-rims 6 on the road-bed, except possibly temporarily in the form shown in Fig. 6 with cup-rims inturned all around. But even here the inturned rims nevertheless act after the manner of sharp shod edges to prevent slipping and skidding, and this condition increases after the rivet has become somewhat worn. Thus assuming the rivet of Fig. 6 to be worn down to the line 4—4 in that figure the hardened cup-rim now separated by a space from the shank-head 3 will act with great effect and the top of said head wearing rapidly below the contact edges of the cup on account of its relatively softer nature will give full action to the hard rim of the cup to prevent slipping and skidding.

Of course it is immaterial that when the rivet has been in use for some little time, the cup will free itself in the devices shown from its inseparable connection with the shank member; on the contrary this is one of the advantages of the preferred construction. Thus from one point of view it is immaterial that the cup becomes free in this fashion during wear, because the reason for having the parts rigidly connected is to facilitate riveting and naturally this reason no longer exists after the device has been actually riveted to the material; and on the other hand this automatic freeing of the cup is an advantage because it takes off much of the strain and consequent wear and tear of the shank of the rivet and its washer upon the tire-material by allowing the cup to move and rock on the shank and otherwise conform itself to the road to the relief of the shank, the washer, and the tire-material.

It is to be noted that the statement in the annexed claim that the rim of the cup is inturned against the head is intended to cover broadly such feature; in other words, to define said inturned rim whether it be inturned in whole as in Fig. 6, or in part as in Figs. 1 and 3.

Having thus described my invention, what I claim is:

In a rivet, a cup with a hole in its bottom, a shank extending through said hole with a head retained in the interior of the cup and separated therefrom by a substantial annular space except at the rim of the cup, which is inturned against the head.

In witness whereof, I have signed my name to the foregoing specification in the presence of two subscribing witnesses.

EDWIN B. STIMPSON.

Witnesses:
  Jos. F. O'Brien,
  E. W. Scherr, Jr.